L. J. BUESSE.
BASE FOR SUPPORTING VISES AND THE LIKE ON COLUMNS.
APPLICATION FILED NOV. 1, 1915.
1,221,507.
Patented Apr. 3, 1917.
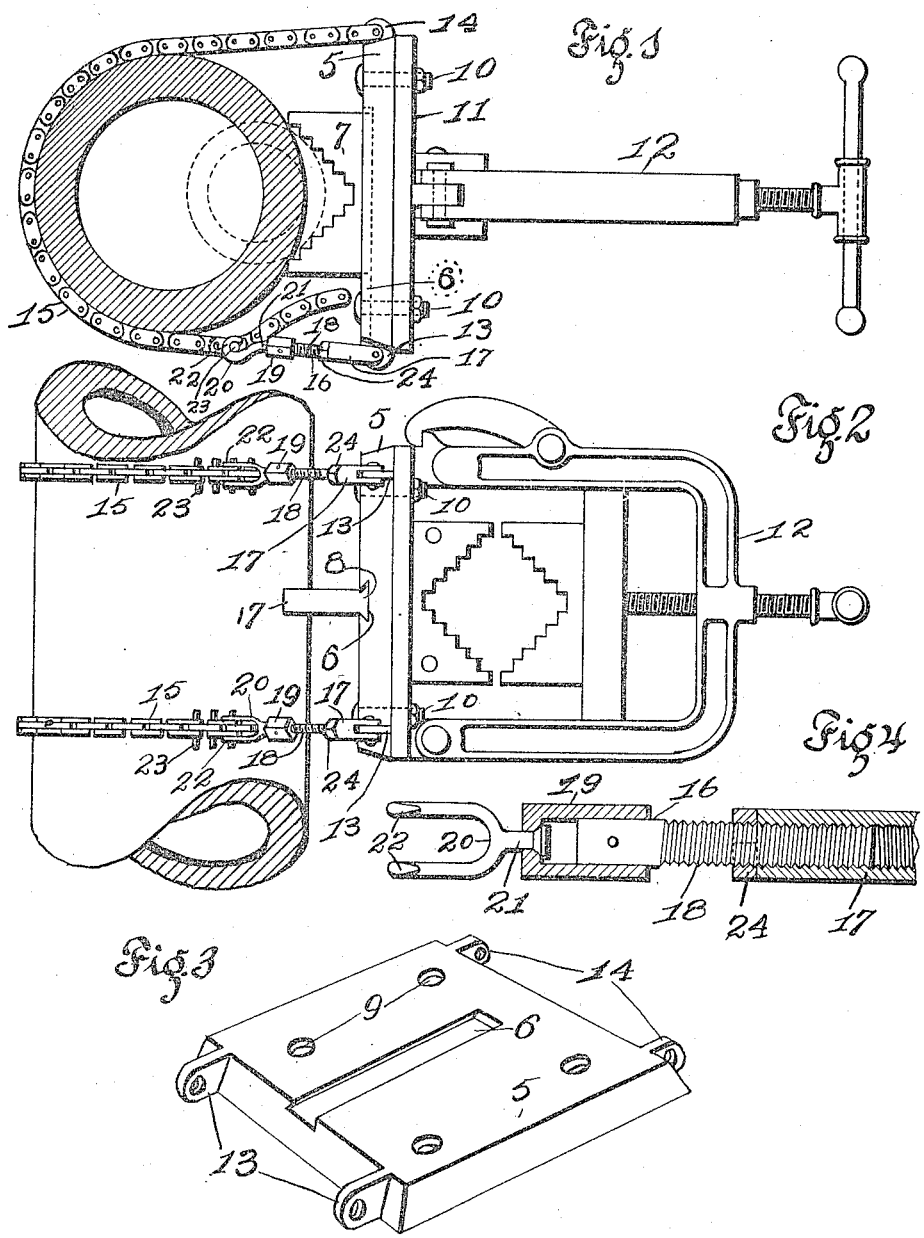

UNITED STATES PATENT OFFICE.

LEO J. BUESSE, OF WEBSTER GROVES, MISSOURI.

BASE FOR SUPPORTING VISES AND THE LIKE ON COLUMNS.

1,221,507.

Specification of Letters Patent.

Patented Apr. 3, 1917.

Application filed November 1, 1915. Serial No. 59,044.

*To all whom it may concern:*

Be it known that I, LEO J. BUESSE, a citizen of the United States, and resident of Webster Groves, Missouri, have invented certain new and useful Improvements in Bases for Supporting Vises and the like on Columns, of which the following is a specification.

This invention relates to improvements in a base for supporting vises and the like on columns, and has for its object a base member provided with a means whereby the same can be rigidly and firmly clamped on any shape or column where it is found necessary to support a vise, especially for the type of clamping device for threading the same.

Figure 1, is a top plan view of my invention shown in clamped position on a column.

Fig. 2, is a side view of the same.

Fig. 3, is a detail perspective view of the base with the clamping chain and fastening devices removed.

Fig. 4, is a detail sectional view of the clamping device made use of in connection with my invention.

In carrying out my invention I provide a base 5, constructed preferably rectangular in form, the same being provided with a dove-tailed groove 6, in which is adapted to be inserted a supporting and clamping jaw 7; the base thereof being provided with dove-tailed projections 8, which are arranged to conform with the dove-tailed groove 6. This base is provided with openings 9, through which bolts 10, or other clamping or fastening devices are inserted so that the base projection 11 of the vise 12 is firmly mounted.

In the illustration I show an ordinary pipe vise which is of the ordinary and common construction and in which all classes of pipes, tubing, or rods may be firmly clamped in order to thread the same.

On the base 5, are provided projecting lugs or ears 13, and 14. On the ears 14, are firmly attached chains 15; and on the lugs or ears 13, are hingedly mounted clamping devices 16, consisting of a bifurcated member 17, provided with internal screw threads, and in the same is located a threaded bolt 18, the bifurcated ends of the member being hingedly connected to the ears 13, by means of a bolt or rivet by which the same is firmly held in position. On the opposite end of the threaded bolt 18, is located a cap or sleeve 19, supporting a yoke 20, the same being constructed in the form of a swivel so that the yoke 20 may properly swivel in its position on its shank 21; so that when the hooks 22, formed on the ends of the yoke are placed in position over the projecting pins 23, extending beyond the links of the chain 15, the bolt 18, may be turned by means of the rectangular construction of the cap or sleeve 19, so as to take up the lost motion and tightly bind the chains around the column, in order to firmly grip the base in position as shown.

On the threaded portion of the bolt 18, is located a lock-nut 24; this lock-nut is for the purpose to properly tighten the bolts in position after the proper adjustment has been made, in order to firmly clamp the device in position on a column. When the device is used on a rounded column I use the locking jaw 7, in order that its teeth may properly bite in the surface or periphery of the column, when the chains 15, are properly adjusted; but when it is desired to support the vise on a square, hexagonal, or octagonal column, the jaw 7, is removed from its position out of the dove-tailed groove 6, and the flat surface of the base is then brought in contact with the flat or rectangular surface of the column. In this manner a pipe vise can be properly supported in position against a column without in any way marring the column or causing the vise proper to be fastened against the column by lag screws or the like, which is necessary at the present time.

The device is simple in construction and as before stated used specifically for supporting any style of vise against any column of any shape or material, and can be readily and easily attached.

Having fully described my invention what I claim is:

A device of the class described comprising a flat base adapted to support a pipe vise having its one face provided with an elongated dove-tailed groove, a pair of perforated ears formed integral on two sides and arranged opposite to each other, a detachable jaw having its base dove-tailed to correspond with the dove-tailed recess in the plate, said jaw having a V-shaped recess whose surface is provided with teeth and which is designed to contact with a post or pillar, a pair of clamping chains attached permanently to one pair of the perforated ears, an adjusting hook attached to the opposite perforated ears which hook is bifurcated and designed to grip the free ends of the chains, and means for adjusting the tension of the chain.

In testimony whereof, I have signed my name to this specification, in presence of two subscribing witnesses.

LEO J. BUESSE.

Witnesses:
 ALFRED A. EICKS,
 WALTER C. STEIN.

Copies of this patent may be obtained for five cents each, by addressing the "Commissioner of Patents Washington, D. C."